US012811698B2

(12) United States Patent
Chen et al.

(10) Patent No.: US 12,811,698 B2
(45) Date of Patent: Nov. 24, 2026

(54) POWER MEASUREMENT METHOD AND APPARATUS, AND STORAGE MEDIUM AND PROGRAM PRODUCT

(71) Applicant: ZTE Corporation, Shenzhen (CN)

(72) Inventors: Jiangtao Chen, Shenzhen (CN); Dong Zhou, Shenzhen (CN); Longming Zhu, Shenzhen (CN); Liyuan Zhong, Shenzhen (CN); Dao Tian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 255 days.

(21) Appl. No.: 18/701,554

(22) PCT Filed: Nov. 24, 2022

(86) PCT No.: PCT/CN2022/134074
§ 371 (c)(1),
(2) Date: Apr. 15, 2024

(87) PCT Pub. No.: WO2023/103798
PCT Pub. Date: Jun. 15, 2023

(65) Prior Publication Data

US 2024/0421919 A1 Dec. 19, 2024

(30) Foreign Application Priority Data

Dec. 10, 2021 (CN) ......................... 202111510550.4

(51) Int. Cl.
*H04B 17/15* (2015.01)
*H04B 17/10* (2015.01)

(52) U.S. Cl.
CPC .......... *H04B 17/102* (2015.01); *H04B 17/15* (2015.01)

(58) Field of Classification Search
CPC .... H04B 17/102; H04B 17/15; H04B 17/202; H04B 17/253; H04B 17/20; Y02D 30/70
See application file for complete search history.

(56) References Cited

U.S. PATENT DOCUMENTS

2012/0050118 A1* 3/2012 Teshirogi ............... G01R 29/10 343/703
2019/0067830 A1* 2/2019 Xu .......................... G02F 1/065
(Continued)

FOREIGN PATENT DOCUMENTS

CN 108923863 11/2018
CN 110460400 11/2019
(Continued)

OTHER PUBLICATIONS

Extended European Search Report for European Application No. 22903221.4, dated Oct. 31, 2025.
(Continued)

*Primary Examiner* — Cindy Trandai
(74) *Attorney, Agent, or Firm* — Vivacqua Crane, PLLC

(57) ABSTRACT

A power measurement method and apparatus, and a storage medium and a program product are disclosed. The power measurement method may include: acquiring a signal power and a signal wavelength of a measurement signal transmitted by a base station under test; calculating an equivalent isotropic radiated power of the measurement signal according to the signal power and the signal wavelength; and calculating a total radiated power of a carrier signal of the base station under test according to the equivalent isotropic radiated power of the measurement signal, a preset target direction parameter and a preset power ratio factor.

7 Claims, 6 Drawing Sheets

(56) References Cited

U.S. PATENT DOCUMENTS

| | | | | |
|---|---|---|---|---|
| 2019/0181688 | A1* | 6/2019 | Su | H02J 50/001 |
| 2019/0229817 | A1* | 7/2019 | Axmon | H04B 7/0691 |
| 2021/0167870 | A1* | 6/2021 | Zhuang | H04B 17/102 |
| 2021/0385762 | A1 | 12/2021 | Elfström et al. | |
| 2022/0178981 | A1* | 6/2022 | Messano | G01R 29/0857 |
| 2022/0393775 | A1 | 12/2022 | Baeder | |
| 2024/0196431 | A1* | 6/2024 | Hirzallah | H04W 24/08 |
| 2024/0214080 | A1* | 6/2024 | Jing | H04W 24/08 |

FOREIGN PATENT DOCUMENTS

| | | | |
|---|---|---|---|
| CN | 112083234 | A | 12/2020 |
| CN | 112702126 | A | 4/2021 |
| CN | 113225147 | A | 8/2021 |
| JP | 2020-024165 | A | 2/2020 |
| WO | WO 2018/210241 | A1 | 11/2018 |
| WO | WO 2020/248917 | A1 | 12/2020 |
| WO | WO 2021/028301 | A1 | 2/2021 |
| WO | WO 2021/099498 | A1 | 5/2021 |

OTHER PUBLICATIONS

[No Author Listed], 3rd Generation Partnership Project; Technical Specification Group Radio Access Network; Evolved Universal Terrestrial Radio Access (E-UTRA); User Equipment (UE) and Mobile Station (MS) Over the Air (OTA) performance; Conformance testing (Release 12). Nov. 2014;3GPP TS 37.544 V0.2.0:1-80.

International Search Report and Written Opinion mailed Feb. 15, 2023 in connection with International Application No. PCT/CN2022/134074.

[No Author Listed], 3rd Generation Partnership Project, 3GPP Technical Specification Group Radio Access Network. Mar. 2019; 3GPP TS 38.141-2 V15.1.0. 269 pages.

* cited by examiner

POWER MEASUREMENT METHOD AND APPARATUS, AND STORAGE MEDIUM AND PROGRAM PRODUCT

CROSS-REFERENCE TO RELATED APPLICATION

This application is a national stage filing under 35 U.S.C. § 371 of International Patent Application Serial No. PCT/CN2022/134074, filed Nov. 24, 2022, which claims priority to Chinese patent application No. 202111510550.4 filed on Dec. 10, 2021. The contents of these applications are incorporated herein by reference in their entirety.

TECHNICAL FIELD

The present disclosure relates to the technical field of communication, in particular to a power measurement method and apparatus, a storage medium and a program product.

BACKGROUND

The rapid development of the information age has given rise to a series of communication demands such as ultra-high speed, high bandwidth, and low latency, leading to the emergence of the 5th generation mobile communication technology (5G). Several key technologies have been introduced in 5G, including massive MIMO, beamforming, and millimeter-wave communication. Here, the millimeter-wave communication technology requires the integration of antennas and radio remote units (RRUs) to form an active antenna system (AAS).

The current standards require the radio frequency (RF) parameters of AAS base stations to be measured using the over-the-air (OTA) method. Total radiated power (TRP) is a critical parameter in OTA testing, which serves as the basis for measuring output power, spurious emissions, adjacent channel leakage ratio (ACLR), and other RF parameters. However, the current standards specify that TRP measurements must be conducted in an anechoic chamber, and there is no clear implementation method for measuring TRP in field-trial environments.

SUMMARY

The following is a summary of the subject matters described in detail herein. This summary is not intended to limit the scope of protection of the claims.

Embodiments of the present disclosure provide a power measurement method and apparatus, a storage medium and a program product, which can measure TRP in field-trial environments.

In accordance with one aspect, an embodiment of the present disclosure provides a power measurement method applied to a power measurement apparatus. The method may include: acquiring a signal power and a signal wavelength of a measurement signal transmitted by a base station under test; calculating an equivalent isotropic radiated power of the measurement signal according to the signal power and the signal wavelength; and calculating a total radiated power of a carrier signal of the base station under test according to the equivalent isotropic radiated power of the measurement signal, a preset target direction parameter and a preset power ratio factor; where the target direction parameter is a directional parameter indicating a direction of the base station under test relative to the power measurement apparatus, and the power ratio factor is a ratio factor used to calculate a power ratio of the measurement signal to the carrier signal.

In accordance with another aspect of the present disclosure, an embodiment further provides a power measurement method. The method may include: acquiring measurement signals transmitted to a plurality of sampling positions by a base station under test, the sampling positions being determined according to a target Rayleigh resolution of a transmitting antenna of the base station under test in a target measurement space; calculating an equivalent isotropic radiated power of each of the measurement signals; and calculating a total radiated power of the base station under test according to the equivalent isotropic radiated powers of all the measurement signals.

In accordance with another aspect of the present disclosure, an embodiment further provides a power measurement apparatus. The method may include: a memory, a processor, and a computer program stored in the memory and executable by the processor, where the computer program, when executed by the processor, causes the processor to perform the power measurement method described above.

In accordance with another aspect of the present disclosure, an embodiment further provides a computer-readable storage medium storing computer-executable instructions configured to cause a computer to perform the power measurement method described above.

In accordance with another aspect of the present disclosure, an embodiment further provides a computer program product. The computer program product may include a computer program or computer instructions, where the computer program or the computer instructions are stored in a computer-readable storage medium, a processor of a computer device reads the computer program or the computer instructions from the computer-readable storage medium, and the computer program or the computer instructions, when executed by the processor, cause the computer device to perform the power measurement methods as described above. The embodiments of the present disclosure calculate the total radiated power of the carrier signal of the base station under test by introducing the target direction parameter and the power ratio factor. Here, the power ratio factor is a ratio factor used to calculate the power ratio of the measurement signal to the carrier signal, that is, the total radiated power of the carrier signal of the base station under test is calculated according to the measurement signal and the power ratio factor, which can avoid using the carrier signal of the base station under test to calculate the total radiated power of the carrier signal, thus reducing the influence on the normal use of the carrier signal. In addition, the target direction parameter is a directional parameter indicating the direction of the base station under test relative to the power measurement apparatus, that is, the total radiated power of the carrier signal of the base station under test is calculated according to the target direction parameter, which can solve the problem of measurement error caused by the inability to accurately capture a beam direction when measuring the total radiated power in field-trial environments. Therefore, the embodiments of the present disclosure realize the measurement of total radiated power in field-trial environments, thus filling the technical gap in related measurement methods.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

Figure 1:
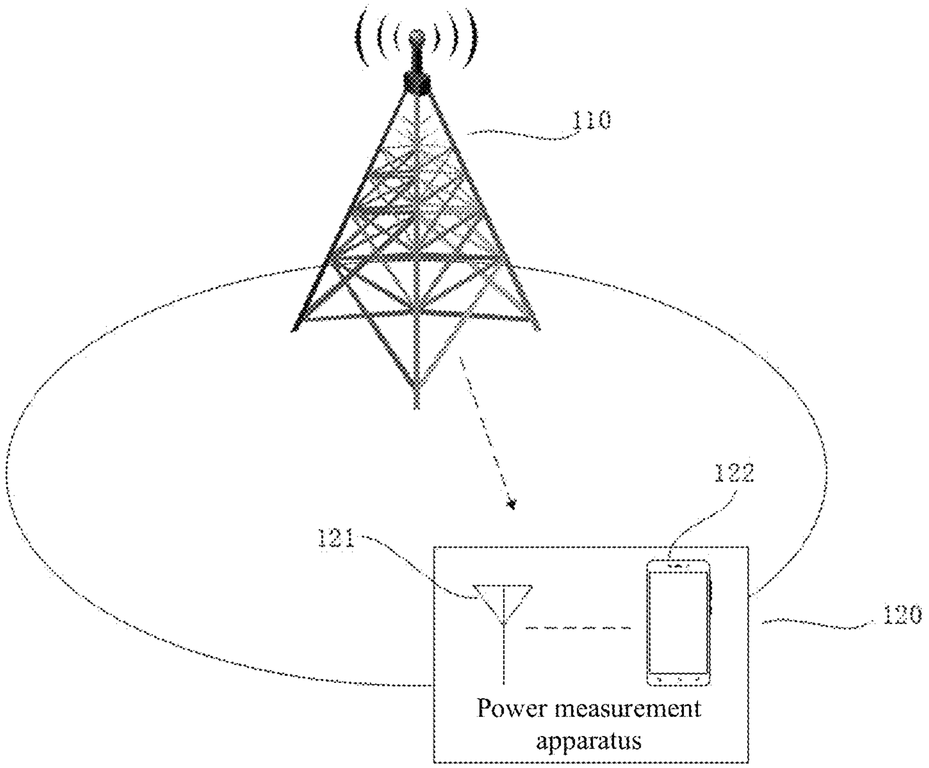
FIG. 1 is a schematic diagram of a system architecture for implementation of a power measurement method according to an embodiment of the present disclosure.

In order to make the objectives, technical schemes and advantages of the present disclosure more apparent, the present disclosure is further described in detail with reference to the accompanying drawings and embodiments. It should be understood that the embodiments described herein are only intended to explain the present disclosure, and are not intended to limit the present disclosure.

It is to be noted that although a logical order is shown in the flowcharts, the steps shown or described may be performed, in some cases, in a different order from the order shown or described in the flowcharts. The terms such as "first" and "second" in the description, claims and above-mentioned drawings are intended to distinguish between similar objects and are not necessarily to describe a specific order or sequence.

The present disclosure provides a power measurement method, a power measurement apparatus, a computer-readable storage medium and a computer program product. A power measurement method according to one embodiment includes: acquiring a signal power and a signal wavelength of a measurement signal transmitted by a base station under test; calculating an equivalent isotropic radiated power (EIRP) of the measurement signal according to the signal power and the signal wavelength; and calculating a total radiated power (TRP) of a carrier signal of the base station under test according to the EIRP of the measurement signal, a preset target direction parameter and a preset power ratio factor. In this embodiment, the TRP of the carrier signal of the base station under test is calculated by introducing the target direction parameter and the power ratio factor. Here, the power ratio factor is a ratio factor used to calculate a power ratio of the measurement signal to the carrier signal, that is, the TRP of the carrier signal of the base station under test is calculated according to the measurement signal and the power ratio factor, which can avoid using the carrier signal of the base station under test to calculate the TRP of the carrier signal, thus reducing the influence on the normal use of the carrier signal. In addition, the target direction parameter is a directional parameter indicating a direction of the base station under test relative to the power measurement apparatus, that is, the TRP of the carrier signal of the base station under test is calculated according to the target direction parameter, which can solve the problem of measurement error caused by the inability to accurately capture a beam direction when measuring the TRP in field-trial environments. A power measurement method according to another embodiment includes: acquiring measurement signals transmitted to a plurality of sampling positions by a base station under test, the sampling positions being determined according to a target Rayleigh resolution of a transmitting antenna of the base station under test in a target measurement space; calculating an EIRP of each of the measurement signals; and calculating a TRP of the base station under test according to the EIRPs of all the measurement signals. In this embodiment, by determining the plurality of sampling positions according to the target Rayleigh resolution of the transmitting antenna of the base station under test in the target measurement space, and calculating the TRP of the base station under test according to the measurement signals obtained at these sampling positions, compared with a sampling method with a step interval of 1° specified by the current standard, this method requires fewer sampling times, improves sampling efficiency, and thus improves measurement efficiency. It is particularly suitable for measuring TRP in field-trial environments that are easily constrained by environmental conditions. Therefore, the technical approach provided by this embodiment of the present disclosure realizes the measurement of TRP in field-trial environments, thus filling the technical gap in related measurement methods.

The embodiments of the present disclosure will be further explained below with reference to the accompanying drawings.

FIG. 1 is a schematic diagram of an implementation environment for a power measurement method according to an embodiment of the present disclosure.

In the embodiment shown in FIG. 1, the implementation environment includes a base station under test 110 and a power measurement apparatus 120. Here, the power measurement apparatus 120 can receive wireless signals transmitted by the base station under test 110, so as to calculate a TRP of the base station under test 110 according to the received wireless signals.

It is to be noted that the power measurement apparatus 120 can move along a radiation spherical surface formed when the base station under test 110 radiates signals outward, so as to receive the wireless signals transmitted by the base station under test 110 at different spatial positions.

In an implementation, as shown in FIG. 1, the power measurement apparatus 120 may include a signal receiving module 121 and a signal analysis module 122, and the signal receiving module 121 and the signal analysis module 122 are connected by wired or wireless communication. Here, the signal receiving module 121 can be installed in a device that can move in a three-dimensional space, such as an unmanned aerial vehicle. By controlling the movement of the device, the device can move along the radiation spherical surface while carrying the signal receiving module 121, allowing the signal receiving module 121 to receive the wireless signals transmitted by the base station under test 110 at different positions on a radiation spherical surface, and transmit the received wireless signals to the signal analysis module 122 for TRP calculation. In some examples, the signal receiving module 121 can be a receiving antenna module, the signal analysis module 122 can be a signal analyzer, and the receiving antenna module and the signal analyzer are connected by wired communication, for example, via a signal line. In other examples, the signal receiving module 121 can be an apparatus including a receiving antenna module and a wireless communication module, the receiving antenna module is electrically connected with the wireless communication module, the signal analysis module 122 can be a signal analyzer, and the wireless communication module and the signal analyzer are connected by wireless communication, for example, via Bluetooth or Wi-Fi.

In another implementation, the power measurement apparatus 120 can be installed in a device that can move in a three-dimensional space, such as an unmanned aerial vehicle. By controlling the movement of the device, the device can move along a radiation spherical surface while carrying the power measurement apparatus 120.

In another implementation, the power measurement apparatus 120 can be a device that can move in a three-dimensional space and has the functions of receiving wireless signals and calculating the TRP according to the wireless signals. By controlling the movement of the power measurement apparatus 120, the power measurement apparatus 120 can move along a radiation spherical surface.

The base station under test 110 has at least the functions of transmitting wireless signals based on preset operation logic or transmitting wireless signals based on the control of operators. The base station under test 110 may be a general mobile communication base station or a millimeter-wave AAS base station, which is not specifically limited here.

The power measurement apparatus 120 has at least the functions of, according to a measurement signal from the base station under test 110, calculating an equivalent isotropic radiated power (EIRP) of the measurement signal, and according to the EIRP of the measurement signal, calculating a TRP of a carrier signal of the base station under test. For example, the power measurement apparatus can acquire a measurement signal transmitted by the base station under test 110 in response to an operation on the power measurement apparatus 120, calculate an EIRP of the measurement signal according to a signal power and a signal wavelength of the measurement signal, and then calculate a TRP of a carrier signal of the base station under test according to the EIRP of the measurement signal. In addition, after the TRP of the carrier signal of the base station under test is calculated by the power measurement apparatus 120, the TRP can be displayed, such that an operator can determine whether RF parameters of the base station under test 110 meet the requirements according to the TRP.

It is to be noted that the above functions of the base station under test 110 and the power measurement apparatus 120 can be applied in different application scenarios.

In an application scenario, the power measurement apparatus 120 includes a receiving antenna module and a signal analyzer, the signal analyzer is provided with a display screen, the receiving antenna module is installed on an unmanned aerial vehicle, and the signal analyzer can receive signals transmitted by the receiving antenna module. In a case where the base station under test 110 is in a normal working state and the network traffic is at its peak, in response to operations on the power measurement apparatus 120 and the unmanned aerial vehicle, with the assistance of the unmanned aerial vehicle, the power measurement apparatus 120 acquires a signal power and a signal wavelength of a measurement signal transmitted by the base station under test 110, then calculates an EIRP of the measurement signal according to the signal power and the signal wavelength, and then calculates a TRP of a carrier signal of the base station under test 110 according to the EIRP of the measurement signal, a preset target direction parameter and a preset power ratio factor. After the power measurement apparatus 120 calculates the TRP of the carrier signal of the base station under test 110, the power measurement apparatus 120 displays the TRP through the display screen.

In another application scenario, the power measurement apparatus 120 includes a receiving antenna module and a signal analyzer, the signal analyzer is provided with a display screen, the receiving antenna module is installed on an unmanned aerial vehicle, and the signal analyzer can receive signals transmitted by the receiving antenna module. In a case where the base station under test 110 is in a normal working state and the network traffic is at a low point, or in a case where the base station under test 110 is in an offline state, in response to operations on the power measurement apparatus 120 and the unmanned aerial vehicle, with the assistance of the unmanned aerial vehicle, the power measurement apparatus 120 acquires measurement signals transmitted to a plurality of sampling positions by the base station under test 110, the sampling positions being determined according to a target Rayleigh resolution of a transmitting antenna of the base station under test 110 in a target measurement space, then the power measurement apparatus 120 calculates an EIRP of each of the measurement signals, and then the power measurement apparatus 120 calculates a TRP of the base station under test according to the EIRPs of all the measurement signals. After the power measurement apparatus 120 calculates the TRP of the base station under test 110, the power measurement apparatus 120 displays the TRP through the display screen.

It is to be understood by those skilled in the art that the implementation environment may be applied to a 5G or 6G communications network system, or subsequent evolved mobile communications network systems, etc., and this embodiment is not specifically limited thereto.

Those of ordinary skill in the art may understand that the implementation environment shown in FIG. 1 does not constitute a limitation on the embodiments of the present disclosure, and there may be more or fewer components than illustrated, or some of the components may be combined, or a different arrangement of the components may be used.

Based on the above implementation environment, various embodiments of the power measurement method of the present disclosure are proposed below.

Figure 2:
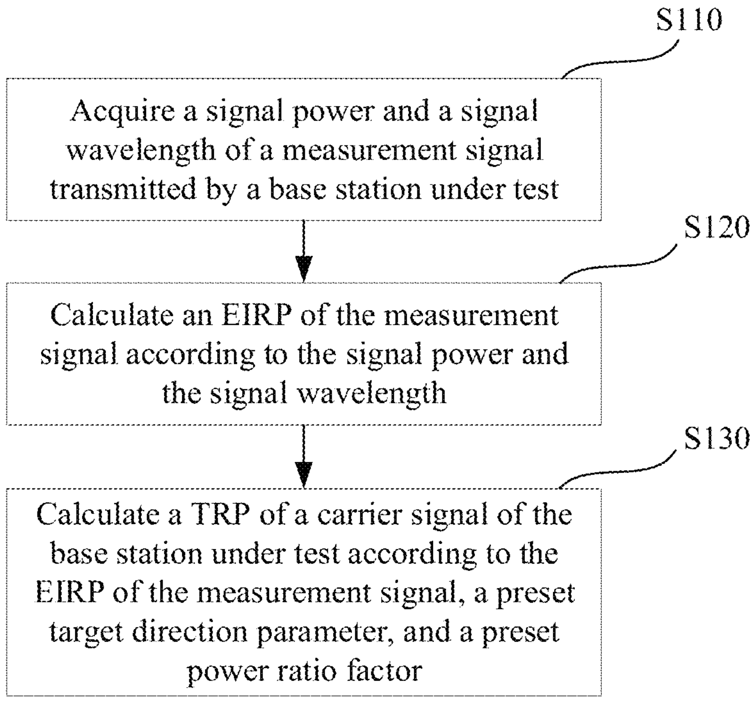
FIG. 2 is a flowchart of a power measurement method at a first communication device side according to an embodiment of the present disclosure.

FIG. 2 is a flowchart of a power measurement method according to an embodiment of the present disclosure. The power measurement method is applied to a power measurement apparatus, such as the power measurement apparatus 120 in the embodiment shown in FIG. 1. The power measurement method can be applied to a scene where a base station under test is in a normal working state and the network traffic is at its peak. The power measurement method may include, but is not limited to, step S110, step S120 and step S130.

At S110, a signal power and a signal wavelength of a measurement signal transmitted by a base station under test are acquired.

It is to be noted that there are various ways to acquire the signal power and the signal wavelength of the measurement signal transmitted by the base station under test, which is not specifically limited here. For example, the signal power and a signal frequency can be acquired when the measurement signal transmitted by the base station under test is received, and then the signal wavelength is calculated according to the signal frequency. For another example, the signal power and the signal wavelength of the measurement signal can be predetermined through negotiation before executing step S110, so when the measurement signal transmitted by the base station under test is received, the signal power and signal wavelength of the measurement signal can be acquired based on negotiation results.

It is to be noted that the measurement signal transmitted by the base station under test can be an instantaneous signal periodically transmitted by the base station under test when the network traffic is at its peak, an average signal transmitted by the base station under test within a preset time period when the network traffic is at its peak, or other types of signals, which is not specifically limited here. Here, when the measurement signal is an instantaneous signal, the acquired signal power of the measurement signal is an instantaneous power; and when the measurement signal is an average signal, the acquired signal power of the measurement signal is an average power.

It is to be noted that the acquired measurement signal transmitted by the base station under test can be measurement signals received at a plurality of sampling positions or a measurement signal received at a fixed sampling position, which is not specifically limited here.

It is to be noted that the measurement signal can be a specific peak beam used for TRP measurement or a reference beam used for TRP measurement, which is not specifically limited here. Here, the reference beam can be a synchronization signal block (SSB) defined by the 3rd generation partnership project (3GPP) in 5G new radio (5GNR).

At S120, an EIRP of the measurement signal is calculated according to the signal power and the signal wavelength.

In this step, since the signal power and the signal wavelength of the measurement signal are acquired in step S110, the EIRP of the measurement signal can be calculated according to the signal power and the signal wavelength, such that the TRP of the carrier signal of the base station under test can be calculated according to the EIRP of the measurement signal in the following step.

It is to be noted that the EIRP refers to a radiated power of the base station under test in a specified direction, and the TRP refers to a total emitted power of the base station under test on a whole radiation spherical surface. Therefore, after calculating the EIRP of each position on the radiation spherical surface, the TRP of the base station under test can be calculated according to the EIRPs, realizing the purpose of measuring the TRP in field-trial environments.

At S130, a TRP of a carrier signal of the base station under test is calculated according to the EIRP of the measurement signal, a preset target direction parameter and a preset power ratio factor.

It is to be noted that the target direction parameter is a directional parameter indicating a direction of the base station under test relative to the power measurement apparatus, and the power ratio factor is a ratio factor used to calculate a power ratio of the measurement signal to the carrier signal.

In this step, since the EIRP of the measurement signal is calculated in step S120, the TRP of the carrier signal of the base station under test can be calculated according to the EIRP of the measurement signal, the preset target direction parameter and the preset power ratio factor, so as to achieve the purpose of measuring the TRP in field-trial environments.

It is to be noted that since the power ratio factor is a ratio factor used to calculate the power ratio of the measurement signal to the carrier signal, calculating the TRP of the carrier signal of the base station under test according to the measurement signal and the power ratio factor can avoid using the carrier signal of the base station under test to calculate the TRP of the carrier signal, thus reducing the influence on the normal use of the carrier signal. In addition, since the target direction parameter is a directional parameter indicating the direction of the base station under test relative to the power measurement apparatus, calculating the TRP of the carrier signal of the base station under test according to the target direction parameter can solve the problem of measurement error caused by the inability to accurately capture a beam direction when measuring the TRP in field-trial environments.

Figure 3:
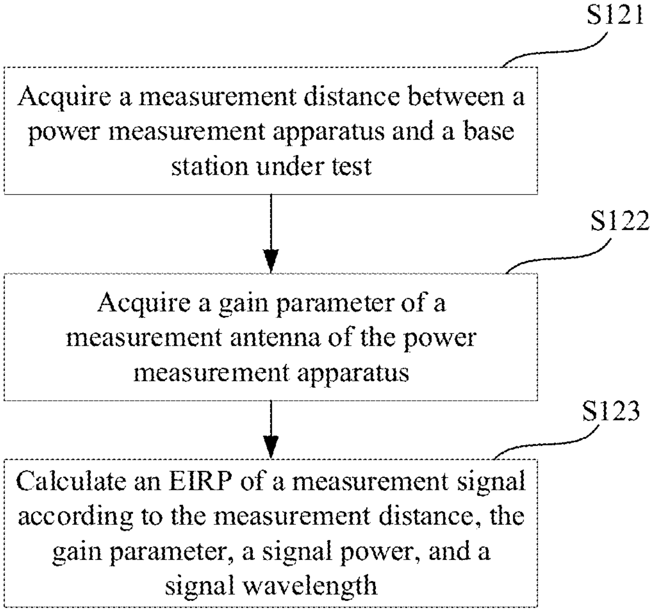
FIG. 3 is a flowchart illustrating the process of determining target vector information in a power measurement method at a first communication device side according to an embodiment of the present disclosure.

Referring to FIG. 3, an embodiment of the present disclosure further explains step S120, which may include but is not limited to steps S121 to S123.

At S121, a measurement distance between the power measurement apparatus and the base station under test is acquired.

It is to be noted that the EIRP of the measurement signal can be calculated according to the following formula (1):

$$EIRP_{test}(\theta_1, \varphi_1) = \frac{P_{rx}(4\pi r)^2}{G(\theta_1, \varphi_1)\lambda^2} \quad (1)$$

In formula (1), $EIRP_{test}(\theta_1, \varphi_1)$ is the EIRP of the measurement signal; $P_{rx}$ is the signal power of the measurement signal; r is the measurement distance between the power measurement apparatus and the base station under test; $G(\theta_1, \varphi_1)$ is a gain parameter of a measurement antenna; $\lambda$ is the signal wavelength of the measurement signal; $\theta_1$ is a value of an elevation of the measurement antenna relative to the base station under test; $\varphi_1$ is a value of an azimuth of the measurement antenna relative to the base station under test.

According to Formula (1), when calculating the EIRP of the measurement signal, it is necessary to acquire the signal power of the measurement signal, the measurement distance between the power measurement apparatus and the base station under test, the gain parameter of the measurement antenna and the signal wavelength of the measurement signal. Therefore, in this step, the measurement distance between the power measurement apparatus and the base station under test can be acquired first, such that the EIRP of the measurement signal can be calculated according to the measurement distance between the power measurement apparatus and the base station under test in the following step.

It is to be noted that there are various ways to acquire the measurement distance between the power measurement apparatus and the base station under test, which is not specifically limited here. For example, when an operator enters the measurement distance in the power measurement apparatus, the power measurement apparatus can directly acquire the measurement distance. For another example, the measurement distance can be pre-stored in the power measurement apparatus, and when the power measurement apparatus is started or a measuring function of the power measurement apparatus is triggered, the power measurement apparatus reads the pre-stored measurement distance. For another example, the power measurement apparatus can communicate with the base station under test, and the base station under test pre-stores a dimension parameter of a transmitting antenna, so the power measurement apparatus can request the dimension parameter of the transmitting antenna from the base station under test. After the power measurement apparatus receives the dimension parameter of the transmitting antenna transmitted by the base station under test, the power measurement apparatus calculates the measurement distance between the power measurement apparatus and the base station under test according to the dimension parameter of the transmitting antenna. For another example, the power measurement apparatus can be provided with a mean for emitting, for example, infrared rays or ultrasonic waves, and the power measurement apparatus can directly measure the measurement distance between the power measurement apparatus and the base station under test by means of, for example, the infrared rays or ultrasonic waves.

It is to be noted that the specific description of calculating the measurement distance between the power measurement apparatus and the base station under test based on the dimension parameter of the transmitting antenna of the base station under test will be provided in subsequent embodiments, and will not be further elaborated here.

At S122, a gain parameter of a measurement antenna of the power measurement apparatus is acquired.

According to Formula (1), when calculating the EIRP of the measurement signal, it is necessary to acquire the signal power of the measurement signal, the measurement distance between the power measurement apparatus and the base station under test, the gain parameter of the measurement antenna and the signal wavelength of the measurement signal. Therefore, in this step, the gain parameter of the measurement antenna can be acquired first, such that the EIRP of the measurement signal can be calculated according to the gain parameter of the measurement antenna in the following step.

It is to be noted that there are various ways to acquire the gain parameter of the measurement antenna of the power measurement apparatus, which is not specifically limited here. For example, when an operator enters the gain parameter in the power measurement apparatus, the power measurement apparatus can directly acquire the gain parameter. For another example, the gain parameter can be pre-stored in the power measurement apparatus, and when the power measurement apparatus is started or a measuring function of the power measurement apparatus is triggered, the power measurement apparatus reads the pre-stored gain parameter.

At S123, an EIRP of the measurement signal is calculated according to the measurement distance, the gain parameter, the signal power, and the signal wavelength.

In this step, since the signal power and the signal wavelength of the measurement signal are acquired in step S110, the measurement distance between the power measurement apparatus and the base station under test is acquired in step S121, and the gain parameter of the measurement antenna of the power measurement apparatus is acquired in step S122, the EIRP of the measurement signal can be calculated using the above formula (1) according to the measurement distance, the gain parameter, the signal power and the signal wavelength, such that the TRP of the carrier signal of the base station under test can be calculated according to the EIRP of the measurement signal in the following step.

Figure 4:
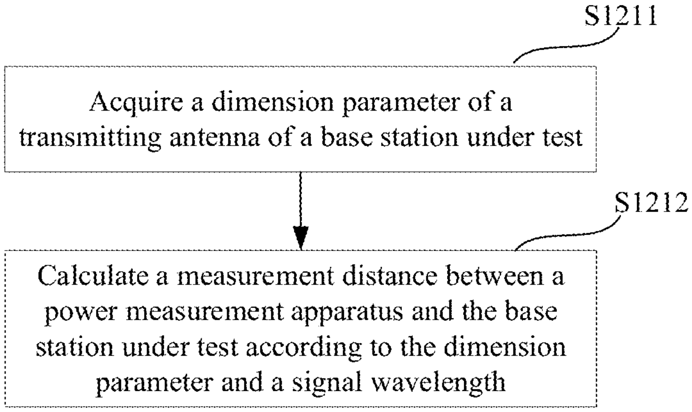
FIG. 4 is a schematic diagram of four pilot signals in a power measurement method at a first communication device side according to an embodiment of the present disclosure.

Referring to FIG. 4, according to an embodiment of the present disclosure, the acquisition of the measurement distance between the power measurement apparatus and the base station under test is further explained. The measurement distance between the power measurement apparatus and the base station under test can be calculated according to the following steps.

At S1211, a dimension parameter of a transmitting antenna of the base station under test is acquired.

At S1212, the measurement distance between the power measurement apparatus and the base station under test is calculated according to the dimension parameter and the signal wavelength.

In this embodiment, to calculate the measurement distance between the power measurement apparatus and the base station under test, the dimension parameter of the transmitting antenna of the base station under test can be acquired first, and then the measurement distance between the power measurement apparatus and the base station under test can be calculated using the following formula (2) according to the dimension parameter and the signal wavelength.

$$r = \frac{2D^2}{\lambda} \tag{2}$$

In formula (2), r is the measurement distance between the power measurement apparatus and the base station under test; D is the dimension parameter of the transmitting antenna; $\lambda$ is the signal wavelength of the measurement signal.

According to formula (2), when calculating the measurement distance between the power measurement apparatus and the base station under test, it is necessary to obtain the dimension parameter of the transmitting antenna and the signal wavelength of the measurement signal first. Therefore, in this embodiment, the dimension parameter of the transmitting antenna of the base station under test is acquired first, and then the measurement distance between the power measurement apparatus and the base station under test is calculated according to the dimension parameter and the signal wavelength of the measurement signal, such that the EIRP of the measurement signal can be calculated according to the measurement distance in the following step.

It is to be noted that there are various ways to acquire the dimension parameter of the transmitting antenna of the base station under test, which is not specifically limited here. For example, when an operator enters the dimension parameter in the power measurement apparatus, the power measurement apparatus can directly acquire the dimension parameter. For another example, the dimension parameter can be pre-stored in the power measurement apparatus, and when the power measurement apparatus is started or a measuring function of the power measurement apparatus is triggered, the power measurement apparatus reads the pre-stored dimension parameter. For another example, the power measurement apparatus can communicate with the base station under test, and the base station under test pre-stores the dimension parameter of the transmitting antenna, so the power measurement apparatus can request the dimension parameter of the transmitting antenna from the base station under test.

Figure 5:
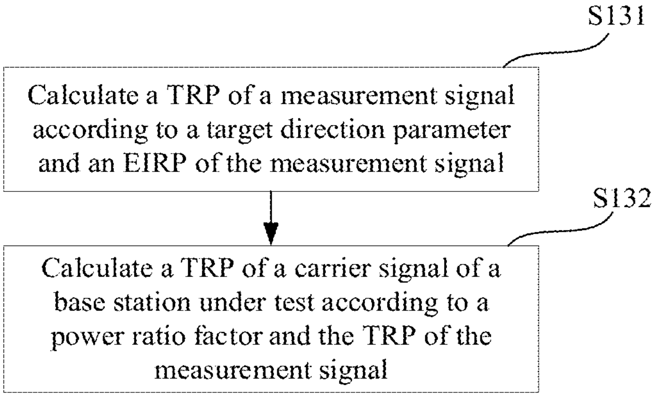
FIG. 5 is a schematic diagram of eight pilot signals in a power measurement method at a first communication device side according to an embodiment of the present disclosure.

Referring to FIG. 5, an embodiment of the present disclosure further explains step S130, which may include but is not limited to steps S131 and S132.

At S131, a TRP of the measurement signal is calculated according to the target direction parameter and the EIRP of the measurement signal.

It is to be noted that to calculate the TRP of the carrier signal of the base station under test, the TRP of the measurement signal can be calculated first, and then the TRP of the carrier signal of the base station under test can be calculated according to the TRP of the measurement signal. Here, the TRP of the measurement signal can be calculated using the following formula (3) according to the EIRP of the measurement signal and the preset target direction parameter.

$$TRP_{test} = \frac{EIRP_{test}(\theta_1, \varphi_1)}{Q(\theta_2, \varphi_2)} \quad (3)$$

In Formula (3), $TRP_{test}$ is the TRP of the measurement signal; $EIRP_{test}(\theta_1, \varphi_1)$ is the EIRP of the measurement signal in the above formula (1); $Q(\theta_2, \varphi_2)$ is the target direction parameter; $\theta_2$ is a value of an elevation of the base station under test relative to the measurement antenna; $\varphi_2$ is a value of an azimuth of the base station under test relative to the measurement antenna.

It is to be noted that there are various ways to acquire the target direction parameter, which is not specifically limited here. For example, when an operator enters the target direction parameter in the power measurement apparatus, the power measurement apparatus can directly acquire the target direction parameter. For another example, the target direction parameter can be pre-stored in the power measurement apparatus, and when the power measurement apparatus is started or a measuring function of the power measurement apparatus is triggered, the power measurement apparatus reads the pre-stored target direction parameter. For another example, the power measurement apparatus can communicate with the base station under test, and the base station under test pre-stores the target direction parameter, so the power measurement apparatus can request the target direction parameter from the base station under test. It is to be noted that a value of the target direction parameter can be provided by the manufacturer of the base station under test.

In this step, since the target direction parameter is a directional parameter indicating the direction of the base station under test relative to the power measurement apparatus, calculating the TRP of the carrier signal of the base station under test according to the target direction parameter and the EIRP of the measurement signal can solve the problem of measurement error caused by the inability to accurately capture a beam direction when measuring the TRP in field-trial environments, thus improving the accuracy and efficiency of the measurement. It is suitable for measuring TRP in field-trial environments that are easily constrained by environmental conditions.

At S132, the TRP of the carrier signal of the base station under test is calculated according to the power ratio factor and the TRP of the measurement signal.

In this step, since the TRP of the measurement signal is calculated in step S131, the TRP of the carrier signal of the base station under test can be calculated using the following formula (4) according to the power ratio factor and the TRP of the measurement signal.

$$TRP = TRP_{test} \cdot C \quad (4)$$

In formula (4), TRP is the TRP of the carrier signal of the base station under test; $TRP_{test}$ is the TRP of the measurement signal in the above formula (3); C is the power ratio factor.

It is to be noted that there are various ways to acquire the power ratio factor, which is not specifically limited here. For example, when an operator enters the power ratio factor in the power measurement apparatus, the power measurement apparatus can directly acquire the power ratio factor. For another example, the power ratio factor can be pre-stored in the power measurement apparatus, and when the power measurement apparatus is started or a measuring function of the power measurement apparatus is triggered, the power measurement apparatus reads the pre-stored power ratio factor. For another example, the power measurement apparatus can communicate with the base station under test, and the base station under test pre-stores the power ratio factor, so the power measurement apparatus can request the power ratio factor from the base station under test. It is to be noted that a value of the power ratio factor can be provided by the manufacturer of the base station under test.

In this step, since the power ratio factor is a ratio factor used to calculate the power ratio of the measurement signal to the carrier signal, calculating the TRP of the carrier signal of the base station under test according to the power ratio factor and the TRP of the measurement signal can avoid using the carrier signal of the base station under test to calculate the TRP of the carrier signal, thus reducing the influence on the normal use of the carrier signal. It is suitable for measuring TRP in field-trial environments that are easily constrained by environmental conditions.

Figure 6:
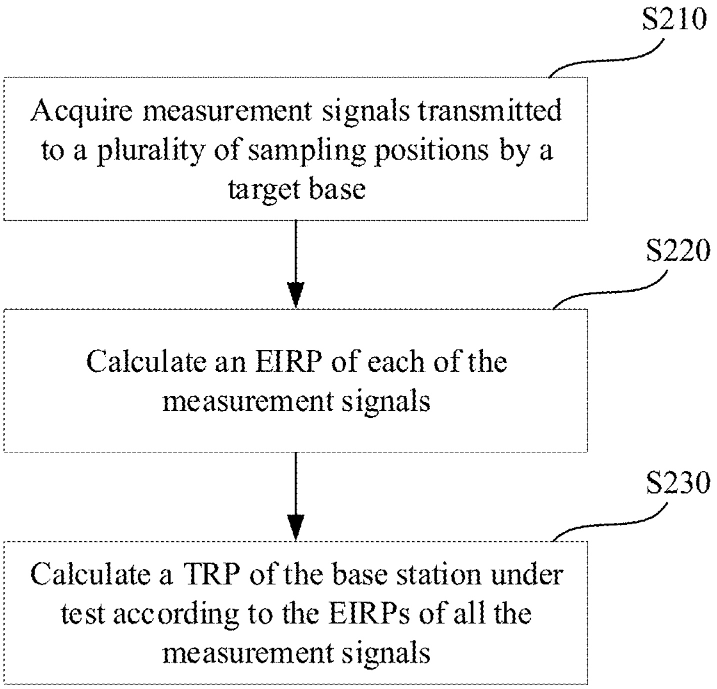
FIG. 6 is a flowchart illustrating the process of determining target control information in a power measurement method at a first communication device side according to an embodiment of the present disclosure.

FIG. 6 is a flowchart of a power measurement method according to another embodiment of the present disclosure. The power measurement method can be applied to a power measurement apparatus, such as the power measurement apparatus 120 in the embodiment shown in FIG. 1. The power measurement method can be applied to a scene where the base station under test is in a normal working state and the network traffic is at a low point, or the power measurement method can be applied to a scene where the base station under test is in an offline state. The power measurement method may include, but is not limited to, step S210, step S220 and step S230.

At S210, measurement signals transmitted to a plurality of sampling positions by a target base are acquired.

It is to be noted that since the TRP refers to a total emitted power of the base station under test on a whole radiation spherical surface, to calculate the TRP of the base station under test, measurement signals can be acquired at a plurality of sampling positions on the radiation spherical surface, and then the TRP of the base station under test can be calculated according to the measurement signals acquired at these sampling positions, so as to achieve the purpose of measuring the TRP in field-trial environments.

It is to be noted that the sampling positions can be determined according to a target Rayleigh resolution of a transmitting antenna of the base station under test in a target measurement space. It is to be noted that the Rayleigh resolution is determined according to the Rayleigh criterion, and the Rayleigh resolution is a resolution in a limit state. Here, the Rayleigh criterion states that two non-coherent point sources are regarded as just resolved in a diffraction-limited system when the center of the Airy disk produced by one point source coincides with the first dark fringe of the Airy disk produced by the other point source.

It is to be noted that the target measurement space can be an angular space, a normalized wave vector space, and other types of space, which can be determined according to the actual application situation, and is not specifically limited here.

It is to be noted that the measurement signal can be random data transmitted by the base station under test using unused resources, a specific peak beam used for TRP measurement, or a reference beam used for TRP measurement, which is not specifically limited here. Here, when the measurement signal is random data transmitted by the base station under test using unused resources, the base station under test can generate random data based on a preset testing strategy (such as a dedicated test signal method) for transmission on the unused resources, so as to transmit the signal by simulating a load carrier. When the measurement signal is a reference beam, the reference beam can be an SSB defined by 3GPP in 5GNR.

At S220, an EIRP of each of the measurement signals is calculated.

In this step, since the measurement signals transmitted to the plurality of sampling positions by the base station under test are acquired in step S210, the EIRP of each of the measurement signals can be calculated, such that the TRP of the base station under test can be calculated according to the EIRPs of all the measurement signals in the following step.

It is to be noted that there are different ways to calculate the EIRP of the measurement signal, which is not specifically limited here. For example, the previous steps S121 to S123 can be used to calculate the EIRP of the measurement signal.

At S230, a TRP of the base station under test is calculated according to the EIRPs of all the measurement signals.

In this step, since the EIRP of each of the measurement signals is calculated in step S220, the TRP of the base station under test can be calculated according to the EIRPs of all the measurement signals.

It is to be noted that there are different ways to calculate the TRP of the base station under test according to the EIRPs of all the measurement signals, which is not specifically limited here. For example, the formula provided in 3GPP TS37.843 can be used to calculate the EIRP of the measurement signal. Alternatively, the formula provided in 3GPP TS37.843 can be optimized first, and then the EIRP of the measurement signal is calculated by using the optimized formula.

It is to be noted that the specific description of calculating the EIRP of the measurement signal by using the optimized formula will be given in subsequent embodiments, and will not be further elaborated here.

It is to be noted that the method provided by the current standard for TRP measurement in an anechoic chamber require sampling measurement signals with a step interval of 1° and then calculating the TRP of the base station under test according to the sampled measurement signals. However, this approach involves extensive sampling processing. For example, to sample measurement signals on the entire radiation spherical surface, it would require 64,800 times of sampling, resulting in low measurement efficiency. In this embodiment, the plurality of sampling positions are determined according to the target Rayleigh resolution of the transmitting antenna of the base station under test in the target measurement space, and the TRP of the base station under test is calculated according to the measurement signals obtained at these sampling positions; and since this embodiment does not sample measurement signals with a step interval of 1°, this method can achieve the calculation of the TRP of the base station under test with fewer sampling times, thus improving sampling efficiency and measurement efficiency. It is particularly suitable for measuring TRP in field-trial environments that are easily constrained by environmental conditions.

Figure 7:
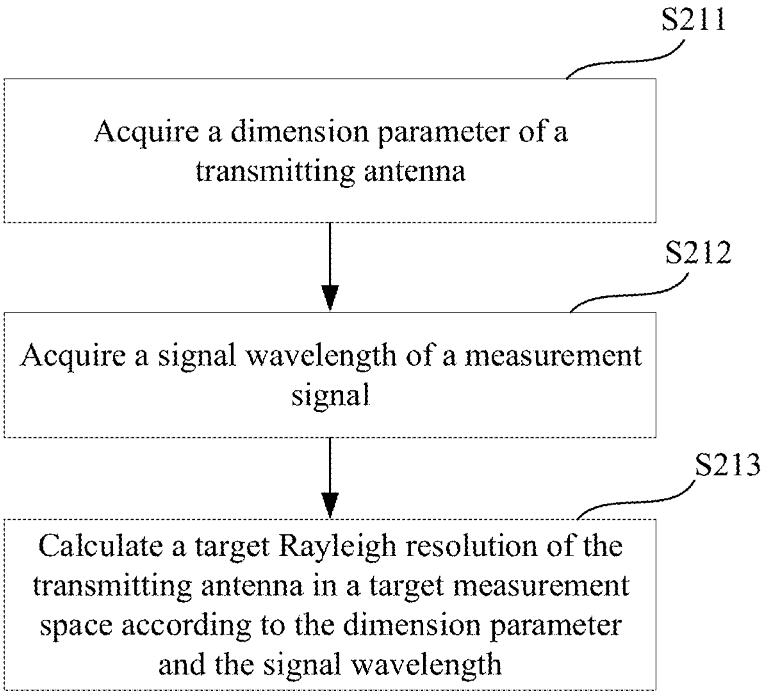
FIG. 7 is a flowchart illustrating the process of transmitting indication information including target control information to a smart panel in a power measurement method at a first communication device side according to an embodiment of the present disclosure.

Referring to FIG. 7, according to an embodiment of the present disclosure, the acquisition of the target Rayleigh resolution is further explained. In a case where the dimension parameter of the transmitting antenna of the base station under test is known, the target Rayleigh resolution can be obtained by the following steps.

At S211, the dimension parameter of the transmitting antenna is acquired.

At S212, a signal wavelength of the measurement signal is acquired.

At S213, the target Rayleigh resolution of the transmitting antenna in the target measurement space is calculated according to the dimension parameter and the signal wavelength.

In this embodiment, in a case where the dimension parameter of the transmitting antenna is known, to calculate the target Rayleigh resolution of the transmitting antenna in the target measurement space, the dimension parameter of the transmitting antenna and the signal wavelength of the measurement signal can be acquired first, and then the target Rayleigh resolution of the transmitting antenna in the target measurement space can be calculated according to the dimension parameter and the signal wavelength.

It is to be noted that for different types of target measurement spaces, there can be different ways to calculate the target Rayleigh resolution of the transmitting antenna in the target measurement space according to the dimension parameter and the signal wavelength. The following examples are provided for illustration purposes.

In a case where the target measurement space is an angular space, the target Rayleigh resolution of the transmitting antenna in the angular space can be calculated using the following formula (5) according to the dimension parameter and the signal wavelength.

$$\theta_r = \frac{180°}{\pi}\sin^{-1}\left(\frac{\lambda}{D_z}\right),\ \varphi_r = \frac{180°}{\pi}\sin^{-1}\left(\frac{\lambda}{D_y}\right) \quad (5)$$

In formula (5), $\theta_r$ is a target Rayleigh resolution of the transmitting antenna in an elevation direction in the angular space; $\varphi_r$ is a target Rayleigh resolution of the transmitting antenna in an azimuth direction in the angular space; $D_y$ is a maximum antenna aperture of the transmitting antenna in a horizontal direction; $D_z$ is a maximum antenna aperture of the transmitting antenna in a vertical direction; $\lambda$ is the signal wavelength. It is to be noted that the above formula (5) can be adjusted to the following formula (6) in a case where the values of $\theta_r$ and $\varphi_r$ are both small:

$$\theta_r = \frac{180°}{\pi}\frac{\lambda}{D_z},\ \varphi_r = \frac{180°}{\pi}\frac{\lambda}{D_y} \quad (6)$$

Through formula (6), the target Rayleigh resolution of the transmitting antenna in the angular space can be calculated more conveniently, such that the efficiency of determining the sampling positions according to the target Rayleigh resolution can be improved to a certain extent. This allows for improving the calculation efficiency of the TRP of the base station under test.

In a case where the target measurement space is a normalized wave vector space, the target Rayleigh resolution of the transmitting antenna in the normalized wave vector space can be calculated using the following formula (7) according to the dimension parameter and the signal wavelength.

$$K_{yr} = \frac{\lambda}{D_y},\ K_{zr} = \frac{\lambda}{D_z} \quad (7)$$

In formula (7), $K_{yr}$ is a target Rayleigh resolution of the transmitting antenna in an azimuth direction in the normalized wave vector space; $K_{zr}$ is a target Rayleigh resolution of the transmitting antenna in an elevation direction in the normalized wave vector space; $D_y$ is a maximum antenna aperture of the transmitting antenna in a horizontal direction; $D_z$ is a maximum antenna aperture of the transmitting antenna in a vertical direction; $\lambda$ is the signal wavelength.

In addition, according to an embodiment of the present disclosure, the acquisition of the target Rayleigh resolution is further explained. In a case where the target measurement space is an angular space and the dimension parameter of the transmitting antenna of the base station under test is unknown, the target Rayleigh resolution can be obtained by the following steps:

- acquiring a first null beam width (FNBW) of the measurement signal; and
- calculating the target Rayleigh resolution of the transmitting antenna in the angular space according to the FNBW.

In this embodiment, in a case where the dimension parameter of the transmitting antenna is unknown, for example, in a case where it is difficult to open an antenna housing of the transmitting antenna of the base station under test, resulting in the inability to accurately determine the dimension parameter of the transmitting antenna, it is possible to measure an FNBW of a main beam in elevation and azimuth directions of a spherical coordinate system that includes a maximum radiation power point, and then, based on the FNBW and using the following formula (8), the target Rayleigh resolution of the transmitting antenna in the angular space can be calculated.

$$\theta_r = FNBW_\theta/2,\ \varphi_r = FNBW_\varphi/2 \quad (8)$$

In formula (8), $\theta_r$ is a target Rayleigh resolution of the transmitting antenna in an elevation direction in the angular space; $\varphi_r$ is a target Rayleigh resolution of the transmitting antenna in an azimuth direction in the angular space; $FNBW_\theta$ is an FNBW of the measurement signal in an elevation direction; $FNBW_\varphi$ is an FNBW of the measurement signal in an azimuth direction.

It is to be noted that FNBW, also known as main lobe opening angle, refers to an included angle between first nulls on both sides of a main lobe in a plane containing the main lobe in an antenna radiation pattern. FNBW is an important lobe pattern parameter, used to describe the directionality of an antenna.

In addition, according to an embodiment of the present disclosure, the acquisition of the target Rayleigh resolution is further explained. In a case where the target measurement space is a normalized wave vector space and the dimension parameter of the transmitting antenna of the base station under test is unknown, the target Rayleigh resolution can be obtained by the following steps:

- acquiring an FNBW of the measurement signal;
- calculating a candidate Rayleigh resolution of the transmitting antenna in an angular space according to the FNBW; and
- mapping the candidate Rayleigh resolution to obtain the target Rayleigh resolution of the transmitting antenna in the normalized wave vector space.

In this embodiment, in a case where the dimension parameter of the transmitting antenna is unknown, for example, in a case where it is difficult to open an antenna housing of the transmitting antenna of the base station under test, resulting in the inability to accurately determine the dimension parameter of the transmitting antenna, it is possible to measure an FNBW of a main beam in elevation and azimuth directions of a spherical coordinate system that includes a maximum radiation power point, and then, based on the FNBW and using the above formula (8), the candidate Rayleigh resolution of the transmitting antenna in the angular space is calculated, followed by mapping the candidate Rayleigh resolution in the angular space to the normalized wave vector space to obtain the target Rayleigh resolution of the transmitting antenna in the normalized wave vector space.

It is to be noted that the candidate Rayleigh resolution in the angular space can be mapped to the normalized wave vector space by the following formula (9), so as to obtain the target Rayleigh resolution of the transmitting antenna in the normalized wave vector space.

$$K_y = \sin\theta\sin\varphi,\ K_z = \cos\theta \quad (9)$$

In formula (9), $K_y$ is a target Rayleigh resolution of the transmitting antenna in an azimuth direction in the normalized wave vector space; $K_z$ is a target Rayleigh resolution of the transmitting antenna in an elevation direction in the normalized wave vector space; $\theta$ is a target Rayleigh resolution of the transmitting antenna in an elevation direction in the angular space; φ is a target Rayleigh resolution of the transmitting antenna in an azimuth direction in the angular space.

In addition, according to an embodiment of the present disclosure, the determination of the sampling positions is further explained. In a case where the target measurement space is an angular space, the sampling positions can be obtained by the following steps:

determining a sampling interval according to the target Rayleigh resolution; and determining the plurality of sampling positions in the angular space according to the sampling interval.

In this embodiment, in a case where the target measurement space is an angular space, after calculating the target Rayleigh resolution, the sampling interval can be determined according to the target Rayleigh resolution, and then the plurality of sampling positions are determined in the angular space according to the sampling interval.

In some embodiments, the sampling interval can be set to be smaller than or equal to the target Rayleigh resolution. For example, in practical application, the sampling interval can be set to be equal to the target Rayleigh resolution.

It is to be noted that, for example, in a 5G base station, an output signal power of a millimeter-wave massive MIMO (i.e., the transmitting antenna) is basically concentrated in a front half of the radiation spherical surface containing the main beam, backward radiation is relatively small, and its contribution to the TRP can be almost neglected. Therefore, a plurality of sampling positions can be determined within the front half of the radiation spherical surface only based on the sampling interval, so as to acquire measurement signals transmitted by the base station under test at these sampling positions, which enables the calculation of the TRP of the base station under test based on these measurement signals.

In addition, according to an embodiment of the present disclosure, the determination of the sampling positions is further explained. In a case where the target measurement space is a normalized wave vector space, the sampling positions can be obtained by the following steps:

determining a sampling interval according to the target Rayleigh resolution;

determining a plurality of candidate sampling positions in the normalized wave vector space according to the sampling interval; and mapping each of the candidate sampling positions to obtain the plurality of sampling positions in an angular space.

In this embodiment, in a case where the target measurement space is a normalized wave vector space, after calculating the target Rayleigh resolution, the sampling interval can be determined according to the target Rayleigh resolution, then the plurality of candidate sampling positions can be determined in the normalized wave vector space according to the sampling interval, and then the candidate sampling positions in the normalized wave vector space are mapped to the angular space to obtain the plurality of sampling positions in the angular space.

In some embodiments, the sampling interval can be set to be smaller than or equal to the target Rayleigh resolution. For example, in practical application, the sampling interval can be set to be equal to the target Rayleigh resolution.

In some embodiments, assuming that the sampling intervals are $K_{step,y}$ and $K_{step,z}$, where $K_{step,y}$ is the sampling interval in the azimuth direction in the normalized wave vector space, $K_{step,z}$ is the sampling interval in the elevation direction in the normalized wave vector space, so a group of discrete values can be obtained through uniform sampling in the normalized wave vector space based on the sampling intervals $K_{step,y}$ and $K_{step,z}$, forming vector sampling points $\vec{K}_{m,n}=\hat{y}K_{ym}+\hat{z}K_{zn}$ in the normalized wave vector space, where $\hat{y}$ and $\hat{z}$ are both coefficients, $K_{ym}$ is a unit vector in the azimuth direction in the normalized wave vector space, and $K_{zn}$ is a unit vector in the elevation direction in the normalized wave vector space; then, a vector $(K_{ym}, K_{zn})$ of $|\vec{K}_{m,n}|<1$ is selected as uniform sampling points (that is, candidate sampling positions) in the normalized wave vector space; and then, the uniform sampling points $(K_{ym}, K_{zn})$ in the normalized wave vector space are mapped into sampling points $(\theta_n, \varphi_{m,n})$ in the angular space by using the above formula (9), so as to obtain the plurality of sampling positions in the angular space. It is worth noting that $\theta_n$ and $\varphi_{m,n}$ are unevenly distributed in the angular space.

Figure 8:
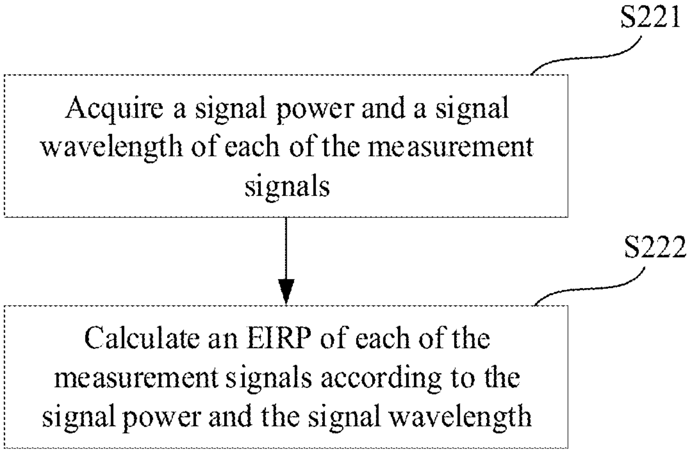
FIG. 8 is a flowchart of a power measurement method at a smart panel side according to an embodiment of the present disclosure.

Referring to FIG. 8, an embodiment of the present disclosure further explains step S220, which may include but is not limited to the following steps.

At S221, a signal power and a signal wavelength of each of the measurement signals are acquired.

At S222, the EIRP of each of the measurement signals is calculated according to the signal power and the signal wavelength.

It is to be noted that there are various ways to acquire the signal power and the signal wavelength of each of the measurement signals, which is not specifically limited here. For example, the signal power and a signal frequency can be acquired when the measurement signal transmitted by the base station under test is received, and then the signal wavelength is calculated according to the signal frequency. For another example, the signal power and the signal wavelength of the measurement signal can be predetermined through negotiation before executing step S221, so when the measurement signal transmitted by the base station under test is received, the signal power and signal wavelength of the measurement signal can be acquired based on negotiation results.

It is to be noted that since the signal power and the signal wavelength of each of the measurement signals are acquired in step S221, the EIRP of each of the measurement signals can be calculated according to the signal power and the signal wavelength, such that the TRP of the base station under test can be calculated according to the EIRPs of all the measurement signals in the following step.

Figure 9:
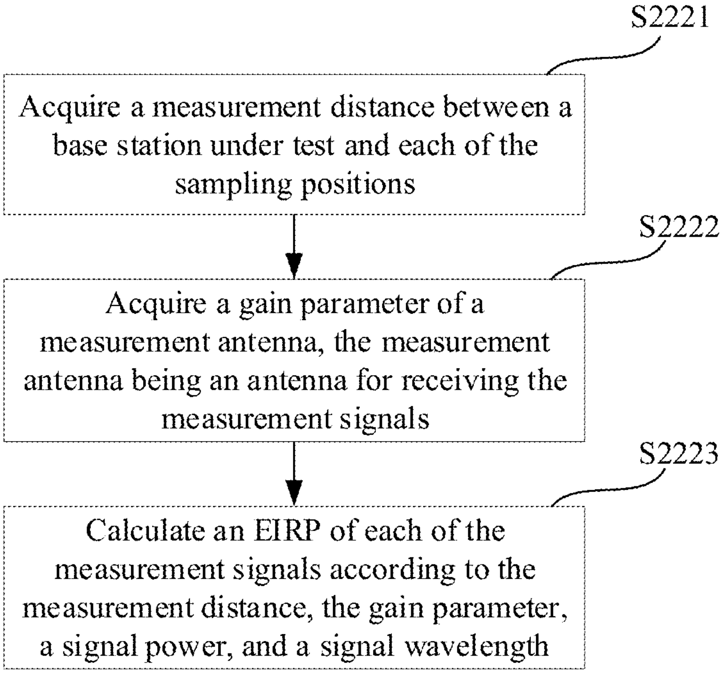
FIG. 9 is a flowchart illustrating the process of adjusting an electromagnetic unit in a smart panel according to target control information in a power measurement method at a smart panel side according to an embodiment of the present disclosure.

Referring to FIG. 9, an embodiment of the present disclosure further explains step S222, which may include but is not limited to the following steps.

At S2221, a measurement distance between the base station under test and each of the sampling positions is acquired.

At S2222, a gain parameter of a measurement antenna is acquired, the measurement antenna being an antenna for receiving the measurement signals.

At S2223, the EIRP of each of the measurement signals is calculated according to the measurement distance, the gain parameter, the signal power, and the signal wavelength.

It is to be noted that since each of the sampling positions is within a radiation spherical surface of the base station under test, the measurement distances between the base station under test and each of the sampling positions are equal, that is, the measurement distances between the base station under test and all the sampling position can be obtained simply by acquiring the measurement distance between the base station under test and one of the sampling positions.

It is to be noted that there are various ways to acquire the measurement distance between the base station under test and each of the sampling positions, which is not specifically limited here. For example, when an operator enters the measurement distance in the power measurement apparatus from the sampling position, the power measurement apparatus can directly acquire the measurement distance. For another example, the measurement distance can be pre-stored in the power measurement apparatus, and when the power measurement apparatus is started or a measuring function of the power measurement apparatus is triggered, the power measurement apparatus reads the pre-stored measurement distance. For another example, the power measurement apparatus arranged at the sampling position can communicate with the base station under test, and the base station under test pre-stores a dimension parameter of a transmitting antenna, so the power measurement apparatus can request the dimension parameter of the transmitting antenna from the base station under test. After the power measurement apparatus receives the dimension parameter of the transmitting antenna transmitted by the base station under test, the power measurement apparatus calculates the measurement distance between the base station under test and the sampling position according to the dimension parameter of the transmitting antenna. For another example, the power measurement apparatus arranged at the sampling position can be provided with a mean for emitting, for example, infrared rays or ultrasonic waves, and the power measurement apparatus arranged at the sampling position can directly measure the measurement distance between the base station under test and the sampling position by means of, for example, the infrared rays or ultrasonic waves.

It is to be noted that there are various ways to acquire the gain parameter of the measurement antenna, which is not specifically limited here. For example, when an operator enters the gain parameter in the power measurement apparatus, the power measurement apparatus can directly acquire the gain parameter. For another example, the gain parameter can be pre-stored in the power measurement apparatus, and when the power measurement apparatus is started or a measuring function of the power measurement apparatus is triggered, the power measurement apparatus reads the pre-stored gain parameter.

It is to be noted that since the signal power and the signal wavelength of each of the measurement signals are acquired in step S221, the measurement distance between the base station under test and each of the sampling positions is acquired in step S2221, and the gain parameter of the measurement antenna is acquired in step S2222, the EIRP of each of the measurement signals can be calculated using the above formula (1) according to the measurement distance, the gain parameter, the signal power and the signal wavelength, such that the TRP of the base station under test can be calculated according to the EIRPs of all the measurement signals in the following step.

In addition, according to an embodiment of the present disclosure, the acquisition of the measurement distance between the base station under test and each of the sampling positions is further explained. The measurement distance between the base station under test and each of the sampling positions can be calculated according to the following steps:

acquiring the dimension parameter of the transmitting antenna;

acquiring a signal wavelength of each of the measurement signals; and calculating the measurement distance between the base station under test and each of the sampling positions according to the dimension parameter and the signal wavelength.

It is to be noted that after the dimension parameter of the transmitting antenna and the signal wavelength of each of the measurement signals are acquired, the measurement distance between the base station under test and each of the sampling positions can be calculated according to the dimension parameter, the signal wavelength and the above formula (2).

It is to be noted that there are various ways to acquire the dimension parameter of the transmitting antenna, which is not specifically limited here. For example, when an operator enters the dimension parameter in the power measurement apparatus, the power measurement apparatus can directly acquire the dimension parameter. For another example, the dimension parameter can be pre-stored in the power measurement apparatus, and when the power measurement apparatus is started or a measuring function of the power measurement apparatus is triggered, the power measurement apparatus reads the pre-stored dimension parameter. For another example, the power measurement apparatus can communicate with the base station under test, and the base station under test pre-stores the dimension parameter of the transmitting antenna, so the power measurement apparatus can request the dimension parameter of the transmitting antenna from the base station under test.

Figure 10:
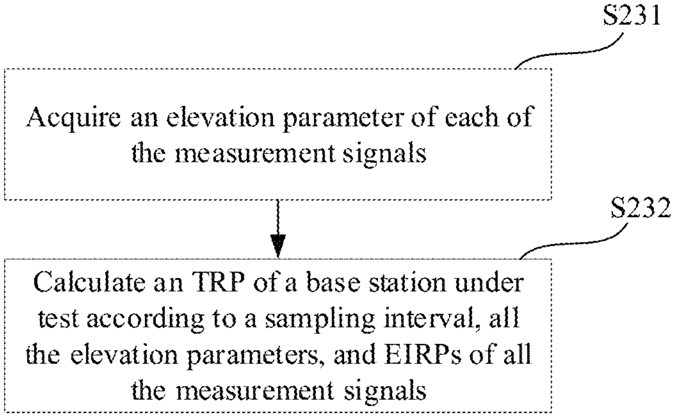
FIG. 10 is a flowchart further illustrating step S230 in a case where a target measurement space is an angular space according to an embodiment of the present disclosure.

Referring to FIG. 10, an embodiment of the present disclosure further explains step S230. In a case where the target measurement space is an angular space, step S230 may include but is not limited to the following steps.

At S231, an elevation parameter of each of the measurement signals is acquired.

At S232, the TRP of the base station under test is calculated according to the sampling interval, all the elevation parameters and the EIRPs of all the measurement signals.

It is to be noted that the elevation parameter of the measurement signal refers to an angle parameter of the measurement signal in a spherical coordinate system with the base station under test (or transmitting antenna) as the coordinate origin. After acquiring the sampling interval, all the elevation parameters and the EIRPs of all the measurement signals, the TRP of the base station under test can be calculated according to the following formula (10).

$$TRP = \frac{\pi}{4NM}\sum_{n=0}^{N-1}\sum_{m=0}^{M-1} EIRP(\theta_n, \varphi_m)\sin(\theta_n) \tag{10}$$

It is to be noted that, according to the foregoing description, since the sampling positions are basically concentrated in the front half of the radiation spherical surface, the formula for calculating the TRP provided in 3GPP TS37.843 can be optimized, so as to obtain the formula (10) suitable for calculating the TRP in field-trial environments. In formula (10), TRP is the TRP of the base station under test; $EIRP(\theta_n, \varphi_m)$ is the EIRP of each of the measurement signals at different sampling positions; $\sin(\theta_n)$ is the elevation parameter of each of the measurement signals; $\theta_n$ is a value of an elevation of different sampling positions relative to the base station under test (or the transmitting antenna); $\varphi_m$ is a value of an azimuth of different sampling positions relative to the base station under test (or the transmitting antenna);

$$N = \frac{180°}{\theta_{step}}, M = \frac{180°}{\varphi_{step}},$$

where $\theta_{step}$ is the sampling interval in an elevation direction, and $\varphi_{step}$ is the sampling interval in an azimuth direction.

In this embodiment, the sampling interval, the elevation parameters and the EIRP of each of the measurement signals are acquired first, and then the TRP of the base station under test is calculated according to the sampling interval, all the elevation parameters and the EIRPs of all the measurement signals, so this embodiment can reduce the sampling times, thereby improving the calculation efficiency of the TRP. Taking a 30 GHz millimeter-wave signal and a 8×16 array antenna (i.e., the transmitting antenna) as an example, in the anechoic chamber measurement method provided by the current standard, uniform sampling with a step interval of 1° is required. For half of the radiation spherical surface, it requires 32,400 (180×180=32,400) times of measurement signal sampling. However, in this embodiment, since $D_y$ is defined as the maximum antenna aperture of the array antenna in the horizontal direction, $D_z$ is defined as the maximum antenna aperture of the array antenna in the vertical direction, λ is the signal wavelength, and antenna elements in the array antenna are generally spaced λ/2 apart, side lengths of the M×N array antenna are respectively $D_y \approx N\lambda/2$ and $D_z \approx M\lambda/2$. For example, the dimensions of an 8×16 array antenna can be represented as $D_y \approx 8\lambda$ and $D_z \approx 4\lambda$. Therefore, in a case where uniform sampling is performed in an angular space based on the Rayleigh resolution, the number of sampling times within half of the radiation spherical surface does not exceed 338 (26×13=338). As a result, this embodiment significantly improves the sampling efficiency.

Figure 11:
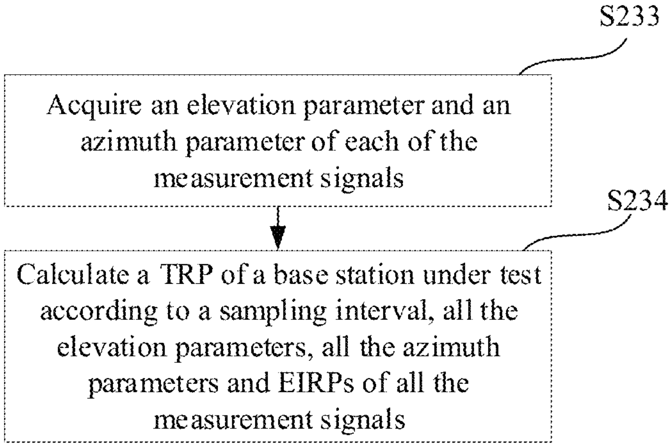
FIG. 11 is a flowchart further illustrating step S230 in a case where a target measurement space is a normalized wave vector space according to an embodiment of the present disclosure.

Referring to FIG. 11, an embodiment of the present disclosure further explains step S230. In a case where the target measurement space is a normalized wave vector space, step S230 may include but is not limited to the following steps.

At S233, an elevation parameter and an azimuth parameter of each of the measurement signals are acquired.

At S234, the TRP of the base station under test is calculated according to the sampling interval, all the elevation parameters, all the azimuth parameters and the EIRPs of all the measurement signals.

It is to be noted that the elevation parameter of the measurement signal refers to an angle parameter, in an elevation direction, of the measurement signal in a spherical coordinate system with the base station under test (or transmitting antenna) as the coordinate origin, and the azimuth parameter of the measurement signal refers to an angle parameter, in an azimuth direction, of the measurement signal in a spherical coordinate system with the base station under test (or transmitting antenna) as the coordinate origin. After the sampling interval, all the elevation parameters, all the azimuth parameters and the EIRPs of all the measurement signals are acquired, the TRP of the base station under test can be calculated according to the following formula (11).

$$TRP = \frac{K_{step,y}K_{step,z}}{4\pi}\sum_{|\vec{K}_{m,n}|<1}\frac{EIRP(\theta_n, \varphi_{m,n})}{\sin(\theta_n)\cos(\varphi_{m,n})} \quad (11)$$

In formula (11), $K_{step,y}$ is the sampling interval in an azimuth direction in the normalized wave vector space; $K_{step,z}$ is the sampling interval in an elevation direction in the normalized wave vector space; Km, is a normalized wave vector of the sampling point, the equation $|\vec{K}_{m,n}|<1$ refers to that in $\vec{K}_{m,n}$, only those sampling points with module values less than 1 are selected, that is, screening is performed using a standard where the module value is less than 1; $\theta_n$ is a value of an elevation in an angular space corresponding to a normalized wave vector discrete sampling point $\vec{K}_{m,n}|_{\vec{K}_{m,n}<1}$, correspondingly, $\sin(\theta_n)$ is the elevation parameter; $\varphi_{m,n}$ is a value of an azimuth in an angular space corresponding to a normalized wave vector discrete sampling point $\vec{K}_{m,n}|_{\vec{K}_{m,n}<1}$, correspondingly, $\cos(\varphi_{m,n})$ is the azimuth parameter; $EIRP(\theta_n,\varphi_{m,n})$ is an EIRP of a discrete sampling point $(\theta_n,\varphi_{m,n})$ in the angular space. It is to be noted that $\theta_n$ and $\varphi_{m,n}$ can also be transformed using the aforementioned formula (9), thereby utilizing a component $K_{ym}$ of a normalized wave vector $\vec{K}_{m,n}$ in the elevation direction to represent $\theta_n$, and utilizing a component $K_{zm}$ of the normalized wave vector $\vec{K}_{m,n}$ in the azimuth direction to represent $\varphi_{m,n}$.

In this embodiment, the sampling interval, all the elevation parameters, all the azimuth parameters and the EIRPs of all the measurement signals are acquired first, and then the TRP of the base station under test is calculated according to the sampling interval, all the elevation parameters, all the azimuth parameters and the EIRPs of all the measurement signals, so redundant sampling points can be eliminated in this embodiment, allowing the calculation efficiency of sampling to be improved. Taking a 30 GHz millimeter-wave signal and an 8×16 array antenna (i.e., the transmitting antenna) as an example, in the anechoic chamber measurement method provided by the current standard, uniform sampling with a step interval of 1° is required. For half of the radiation spherical surface, it requires 32,400 (180×180=32,400) times of measurement signal sampling. However, in this embodiment, since $D_y$ is defined as the maximum antenna aperture of the array antenna in the horizontal direction, $D_z$ is defined as the maximum antenna aperture of the array antenna in the vertical direction, λ is the signal wavelength, and antenna elements in the array antenna are generally spaced λ/2 apart, side lengths of the M×N array antenna are respectively $D_y \approx N\lambda/2$ and $D_z \approx M\lambda/2$. For example, the dimensions of an 8×16 array antenna can be represented as $D_y \approx 8\lambda$ and $D_z \approx 41$. Therefore, the Raleigh resolution in the normalized wave vector space can be calculated as $K_{yr}=\lambda/D_y=1/8$ and $K_{zr}=\lambda/D_z=1/4$. After converting the Raleigh resolution in the normalized wave vector space to the Raleigh resolution in the corresponding angular space using the formula (9) mentioned above, it can be determined through calculation that the number of sampling times within half of the radiation spherical surface does not exceed 75 (25×3-75). Thus, this embodiment can significantly reduce the number of sampling times, thereby greatly improving the TRP measurement efficiency.

In addition, according to an embodiment of the present disclosure, the power measurement method is further explained. Before executing step S210, the power measurement method may further include but is not limited to the following steps:

controlling the base station under test to transmit the measurement signals according to a preset testing strategy, the measurement signals being random data transmitted by the base station under test using unused resources;

or initiating a traffic request to the base station under test using a test terminal, so as to cause the base station under test to transmit the measurement signals.

It is to be noted that in a case where the base station under test is in a normal working state and the network traffic is at a low point, or in a case where the base station under test is in an offline state, there may be low or no network traffic. In order to effectively test the TRP of the base station under test, a dedicated test configuration method or terminal-initiated traffic method can be used to enable the base station under test to emit corresponding measurement signals.

In the dedicated test configuration method, the network operator can enable a test signal method dedicated to the vendor to generate random data, allowing the base station under test to transmit the random data over unused resources to simulate the transmission of a load carrier. It is to be noted that the random data are controlled by the network operator and can be coordinated between the power measuring apparatus and the network operator to allow for the execution of specific testing methods.

In the terminal-initiated traffic method, one or more test terminals can be used to force the base station under test to schedule all resources by downloading large amounts of data, ensuring stable transmission of traffic data and maintaining the stability of beam signals. It is to be noted that the test terminal can be equipped with a subscriber identification module (SIM) dedicated to the network operator, and can receive data under a full carrier bandwidth of the base station under test to ensure the full carrier load. After the test terminal initiates traffic, a beam signal of the base station under test will point to the test terminal, such that the calculation of the TRP of the base station under test can be realized.

In order to more clearly explain the processing flow of the power measurement method provided by the embodiment of the present disclosure, the following embodiment is given in conjunction with application scenarios.

The power measurement method and apparatus, the storage medium and the program product provided by the embodiments of the present disclosure can be applied to various application scenarios, especially to field-trial environments, and can reduce the measurement error and improve the measurement efficiency. The following is a further explanation of field-trial environments.

To measure TRP in field-trial environments, the measurement apparatus needs to move around the base station in its spherical space and receive signals because the position of the base station under test is fixed. The power apparatus in the embodiments of the present disclosure can be a device capable of receiving wireless signals and calculating the TRP based on the wireless signals, which can move in a three-dimensional space. It can also be an apparatus that is capable of receiving wireless signals and calculating the TRP based on the wireless signals, and can be independently set on a device that can move in a three-dimensional space. Furthermore, it can be an apparatus capable of receiving wireless signals and calculating the TRP based on the wireless signals, with a signal receiving module that can be independently set on a device that can move in a three-dimensional space.

TRP measurement in this application scenario also needs to be performed under far-field conditions. Near-field and far-field transmission areas are calculated based on the size of the base station antenna and the wavelength of the frequency, and the positions of a signal analyzer (signal analysis module) and a receiving test antenna (signal receiving module) are specified in the far-field area. In actual measurement, an appropriate test distance can be determined according to the requirements of measurement accuracy, for example, a minimum test distance in the far field can be calculated according to the above formula (2).

It is to be noted that when the field trial distance increases, signal attenuation and uncertainties will also increase. Therefore, the far-field test position should be designated as an area adjacent to the near field if it is feasible.

In a case where the base station is in an online mode and the network traffic is high during TRP measurement in field-trial environments, it is difficult to ensure that the beam direction is fixed during the measurement, that is, stable signals required for the measurement cannot be guaranteed; in the case of low network traffic, it is difficult to ensure the full carrier load and measurement conditions for maximum power. In a case where the base station is in an offline mode, it is necessary to reduce the number of sampling points for the measurement of fixed beams to improve the measurement efficiency and accuracy. The measurement method provided by the embodiment of the present disclosure can solve the above problems.

In a case where the base station is in an online mode, that is, the base station is in a normal working state, it keeps running online. During normal operation of the base station, the network traffic varies in different time periods. In the early stages of network deployment, the traffic load is low. As more UEs start using the frequency band, the traffic will gradually increase. TRP measurement needs to be differentiated based on the network traffic level.

In scenarios where TRP measurement is performed during peak periods of base station operation, the full carrier load and maximum power configuration occur when data are scheduled. In a normal peak operation state, a service signal is time-varying and the beam direction is not fixed. In a case where the signal is stable, a large number of mobile devices carrying receiving test antennas (such as drones) can be deployed at a measurement sampling point during peak periods to perform periodic instantaneous measurements. At the same time, long-term mean measurement is needed to accurately capture temporal transmission caused by the change in beam direction. The required time will vary depending on the base station utilization and distribution of the test terminals. Therefore, in a case where it is not possible to perform EIRP measurement at a large number of sampling points due to unstable signals or limited measurement device conditions, single-point EIRP measurement can be performed instead and used for extrapolating the full carrier power or converting to equivalent TRP. An equivalent value of TRP is measured from the peak beam or reference beam. The reference beam can be an SSB as defined by 3GPP in 5G NR. An SSB beam can be measured to infer the full carrier power or convert to an equivalent value of field-trial TRP. 5G AAS will periodically transmit SSB sets in a plurality of preset beam directions with constant power. The optimal setup for measuring the SSB beam is to use real-time analyzers that can synchronize with the SSB sets during the measurement time, or special devices such as mobile scanners to demodulate the signals.

The EIRP of the test signal to the measurement antenna can be expressed as $EIRP_{test}(\theta_2, \varphi_2)$. Refer to the related description in formula (1) for relevant definitions. Based on the EIRP, the TRP of the test signal can be obtained using the formula (3), and the carrier TRP can be obtained using the formula (4).

In the embodiments of the present disclosure, in a case where TRP measurement is performed during off-peak periods of base station operation, there may be low or no network traffic. To address this, a dedicated test configuration method or test terminal-initiated traffic method can be used. In the dedicated test configuration method, the network operator can enable a test signal method dedicated to the vendor to generate random data for transmission over unused resources, so as to simulate a load carrier. The test signal is controlled by the network operator and can be coordinated between a received signal analyzer and the network operator to allow specific test methods. For a test terminal to initiate traffic, one or more test terminals need to download large amounts of data to force the base station to schedule all resources, so as to ensure stable traffic data transmission and maintain beam signal stability during this period. It is to be noted that the test terminal should be equipped with an SIM card dedicated to the network operator, and can receive data under a full carrier bandwidth of the base station to ensure the full carrier load. After the test terminal initiates traffic, the 5G AAS base station directs its beam towards the test terminal, enabling measurement of the fixed-direction beam signal.

The two measurement methods share the same steps during the off-peak period in an online mode. First, the positions of the test antenna and test terminal are set, with the optimal position being a main-beam area of the base station under test. Next, the test terminal downloads large amounts of test data and maintain high throughput and transmission stability. Finally, a test device is used for signal measurement.

In a case where the base station is in an offline mode, i.e., in a non-working state, it is set to an offline test mode, and a power level and antenna radiation pattern of the base station should remain fixed throughout the measurement process. In a test mode, the base station under test can be set to transmit at full power, and the test terminal needs to download large amounts of test signal data and maintain stable data transmission. The test antenna collects a large number of measurement results at a plurality of sampling points within a radiation spherical surface of Equipment Under Test (EUT) to calculate the TRP. The EUT needs to generate a stable signal during the measurement. To avoid impacting normal operations, the network operator must perform the test before the base station is fully operational.

Figure 12:
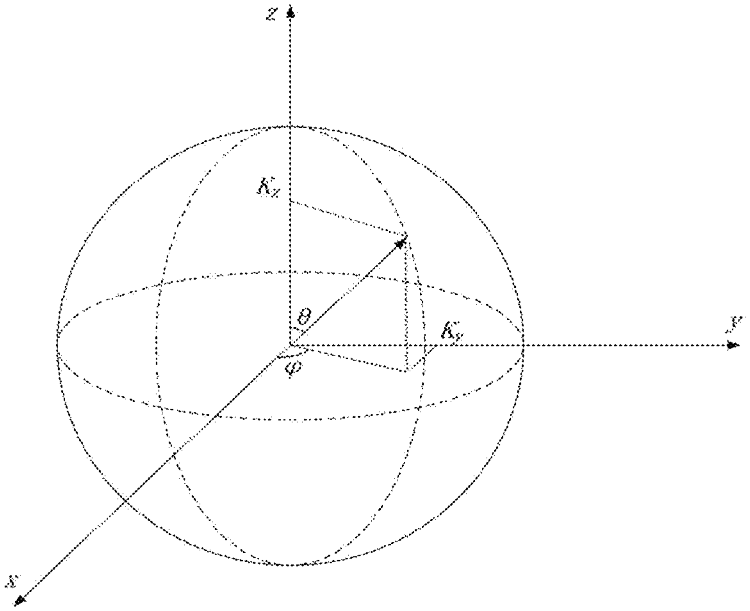
FIG. 12 is a schematic diagram of a spatial coordinate system with an array antenna of a base station under test as a reference point according to an embodiment of the present disclosure.

A measurement sampling method in an embodiment of the present disclosure requires defining a relevant reference coordinate system. FIG. 12 is a schematic diagram of a spatial coordinate system with an array antenna on EUT as a reference point according to this embodiment. The x-axis in the diagram aligns with a normal direction of the antenna array, and the y-axis and z-axis correspond to the horizontal and vertical directions, respectively. The diagram includes two spatial coordinate systems. One is angular space, which is represented using a spherical coordinate system, where θ and φ represent elevation and azimuth respectively, and (90°,0°) represents the x-axis direction. The other is a normalized wave vector space, which is represented using a Cartesian coordinate system, where $K_y$ and $K_z$ represent projections of a normalized wave vector onto the y-axis and z-axis respectively, and (0,0) represents the x-axis direction. There is a corresponding spatial transformation relationship between the angular space and the normalized wave vector space.

In an embodiment of the present disclosure, In both online off-peak period and offline testing mode, two measurement sampling methods are utilized. One is an angular space sampling method, which uses equal angular spacing for sampling in an angular space. The other is a wave vector space sampling method, which employs equidistant sampling intervals in a normalized wave vector space. This sampling method exhibits unequal spacing in an angular space. Detailed explanations for each sampling method will be provided below.

The angular space sampling method samples the EIRP within a traditional angular space, from which the TRP is calculated. This method can be implemented without prior information about AAS, such as antenna gain or directionality. The base station needs to generate a stable signal during the measurement period.

Figure 13:
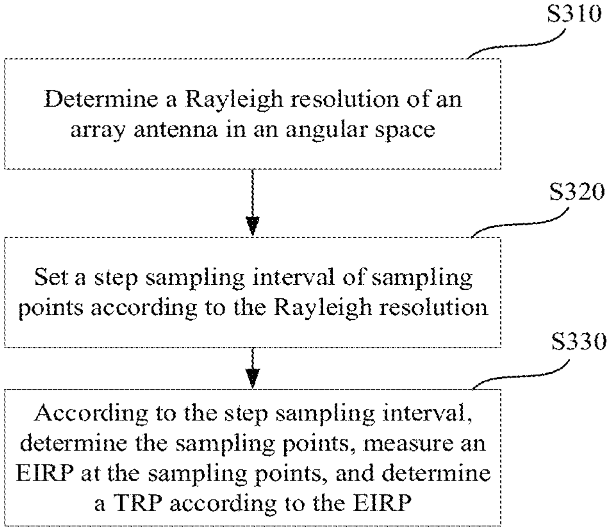
FIG. 13 is a flowchart of an angular space sampling method in an offline test mode according to an embodiment of the present disclosure.

FIG. 13 is a flowchart of an angular space sampling method in an offline test mode according to an embodiment of the present disclosure. The sampling method may include, but is not limited to, step S310, step S320 and step S330.

At 310, a Rayleigh resolution of the array antenna in an angular space is determined.

It is to be noted that different methods are used to determine the Rayleigh resolution of the array antenna in the angular space based on whether an array dimension of the array antenna is known.

In a case where the array dimension of the array antenna is known, the Rayleigh resolution of the array antenna in the angular space can be determined based on the array dimension of the array antenna and a signal wavelength. The Rayleigh resolution of the array antenna in the angular space can be determined according to formula (5). In a case where values of $\theta_r$ and $\varphi_r$ are both small, the Rayleigh resolution of the array antenna in the angular space can be determined according to formula (6).

In a case where the array dimension of the array antenna is unknown, an FNBW is determined, and based on the FNBW, the Rayleigh resolution of the array antenna in the angular space can be determined. In a case where the dimension of the antenna array cannot be accurately known (for example, it is difficult to open an antenna housing of the EUT), an FNBW of a main beam can be measured on an elevation plane and an azimuth plane of a spherical coordinate system containing a maximum radiation power point. Then refer to formula (8) to determine the Rayleigh resolution of the array antenna in the angular space according to the FNBW.

At 320, a step sampling interval of the sampling points is set according to the Rayleigh resolution.

In an embodiment, the step sampling interval of the sampling points is set to be less than or equal to the Rayleigh resolutions $\theta_r$ and $\varphi_r$ of the array antenna in θ and φ directions of the spherical coordinate system, that is, $\theta_{step} \le \theta_r$, $\varphi_{step} \le \varphi_r$.

In an embodiment, the step sampling interval of the sampling points is set to be equal to the Rayleigh resolution.

At 330, according to the step sampling interval, the sampling points are determined, the EIRP is measured at the sampling points, and the TRP is determined according to the EIRP.

After determining the sampling points in the spherical coordinate system, measurement is performed at the sampling points. For a high-frequency 5G base station, an output signal power of a millimeter-wave massive MIMO is basically concentrated in a front half of the radiation spherical surface containing the main beam, backward radiation is relatively small, and its contribution to the TRP can be almost neglected. Therefore, values are not taken for a rear half of the spherical surface.

The angular space sampling method described in the embodiment of the present disclosure can reduce the number of sampling points and improve the calculation efficiency. Taking a 30 GHz millimeter-wave signal and an 8×16 array antenna as an example, in a conventional millimeter-wave measurement method in an anechoic chamber, uniform sampling with a step interval of 1° is required, and sampling half of the spherical surface requires 180×180=32,400 times of sampling. In the embodiments of the present disclosure, $D_y$ and $D_z$ are defined as the maximum antenna apertures of the array antenna in the horizontal direction and the vertical direction respectively, and λ is the signal wavelength. Antenna elements in the array antenna are generally spaced λ/2 apart, and side lengths of M×N are respectively $D_y \approx N\lambda/2$ and $D_z \approx M\lambda/2$. The dimensions of the 8×16 array antenna can be expressed as: $D_y \approx 8\lambda$ and $D_z \approx 4\lambda$. Therefore, by using the Rayleigh resolution in the angular space for uniform sampling, 26×13=338 times of sampling is required at most for sampling half of the spherical surface, significantly improving the sampling efficiency.

The wave vector space sampling method introduces the concept of a normalized wave vector space. This method first acquires uniform sampling points in the normalized wave vector space, and then computes corresponding non-uniform sampling points in the angular space using a transformation formula. This compresses the number of sampling points. This method requires an approximate direction of the beam, with the directional fluctuations within the range of the first null of the beam pattern. The base station needs to generate a stable signal during the measurement period.

The EIRP is sampled in the traditional angular space, based on which the TRP is calculated. This method can be implemented without prior information about AAS, such as antenna gain or directionality. The base station needs to generate a stable signal during the measurement period.

This method performs uniform sampling in the normalized wave vector space ($K_y$, $K_z$). The transformation relationship between the normalized wave vector space ($K_y$, $K_z$) and the angular space is shown in formula (9).

Figure 14:
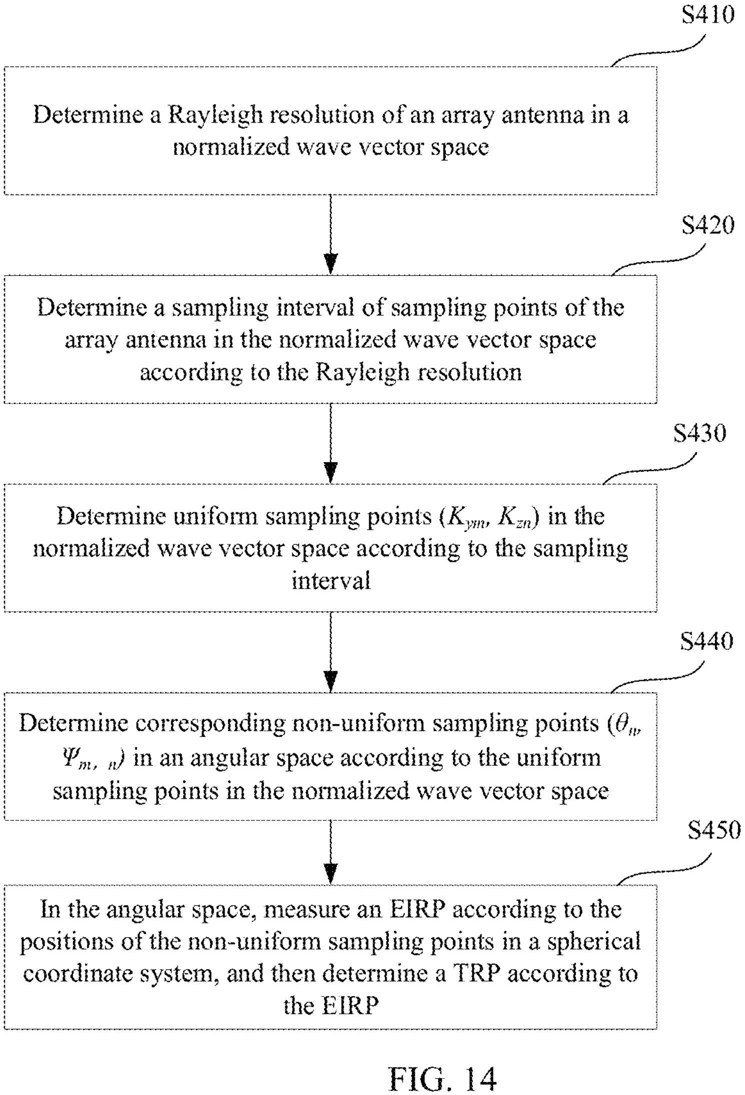
FIG. 14 is a flowchart of a wave vector space sampling method in an offline test mode according to an embodiment of the present disclosure.

FIG. 14 is a flowchart of a wave vector space sampling method in an offline test mode according to an embodiment of the present disclosure. The sampling method may include, but is not limited to, step S410, step S420, step S430, step S440 and step S450.

At 410, a Rayleigh resolution of the array antenna in a normalized wave vector space is determined.

It is to be noted that different methods are used to determine the Rayleigh resolution of the array antenna in the wave vector space based on whether an array dimension of the array antenna is known.

In a case where the array dimension of the array antenna is known, the Rayleigh resolution of the array antenna in the wave vector space can be determined based on the array dimension of the array antenna and a signal wavelength. The Rayleigh resolution of the array antenna in the angular space can be determined according to formula (7).

In a case where the array dimension of the array antenna is unknown, the Rayleigh resolution of the array antenna in the angular space is determined, and the Rayleigh resolution in the angular space is converted into the Rayleigh resolution in the wave vector space.

An FNBW is determined, and based on the FNBW, the Rayleigh resolution of the array antenna in the angular space can be determined. In a case where the dimension of the antenna array cannot be accurately known (for example, it is difficult to open an antenna housing of the EUT), an FNBW of a main beam can be measured on an elevation plane and an azimuth plane of a spherical coordinate system containing a maximum radiation power point. Then refer to formula (8) to determine the Rayleigh resolution of the array antenna in the angular space according to the FNBW.

At 420, according to the Rayleigh resolution, the sampling interval of the sampling points of the array antenna in the normalized wave vector space is determined.

It is to be noted that, in an embodiment, the step sampling interval $K_{step,y}$, $K_{step,z}$ of the sampling points of the array antenna in the normalized wave vector space is set to be less than or equal to the Rayleigh resolution $K_{yr}$, $K_{zr}$, that is, $K_{step,y} \le K_{yr}$, $K_{step,z} \le K_{zr}$.

In an embodiment, the step sampling interval of the sampling points is set to be equal to the Rayleigh resolution.

At 430, uniform sampling points ($K_{ym}$, $K_{zn}$) in the normalized wave vector space are determined according to the sampling interval.

In an embodiment, a group of discrete values can be obtained through uniform sampling in the normalized wave vector space based on the sampling interval $K_{step,y}$, $K_{step,z}$, forming vector sampling points $\vec{K}_{m,n} > \hat{y}K_{ym} + \hat{z}K_{zn}$ in the normalized wave vector space.

A vector ($K_{ym}$, $K_{zn}$) of $|\vec{K}_{m,n}|<1$ is selected as uniform sampling points in the normalized wave vector space.

At 440, the corresponding non-uniform sampling points ($\theta_n$, $\varphi_{m,n}$) in the angular space are determined according to the uniform sampling points in the normalized wave vector space.

In an embodiment, by means of the transformation formula (9) of the normalized wave vector space and the angular space, the sampling points ($\theta_n$, $\varphi_{m,n}$)) in the angular space corresponding to the uniform sampling points ($K_{ym}$, $K_{zn}$) in the normalized wave vector space are determined, where $\theta_n$ and $\varphi_{m,n}$ are unevenly distributed in the angular space.

At 450, in the angular space, the EIRP is measured according to the positions of the non-uniform sampling points in a spherical coordinate system, and then the TRP is determined according to the EIRP.

In an embodiment, the TRP is determined according to formula (11).

The formula (11) can also be expressed in the wave vector space, in which case parameters $\theta_n$ and $\varphi_{m,n}$ can be represented by components $K_{ym}$ and $K_{zn}$ of the normalized wave vector $\overline{K}_{m,n}$ in y and z directions by means of the spatial transformation formulas $K_y=\sin\theta \sin\varphi$ and $K_z=\cos\theta$.

The wave vector space sampling method described in the embodiment of the present disclosure can eliminate redundant sampling points and improve the calculation efficiency of sampling. Similarly, taking a 30 GHz millimeter-wave signal and an 8×16 array antenna as an example, in a conventional millimeter-wave measurement method in an anechoic chamber, uniform sampling with a step interval of 1° is required, and sampling half of the spherical surface requires 180×180=32,400 times of sampling. In the embodiments of the present disclosure, $D_y$ and $D_z$ are defined as the maximum antenna apertures of the array antenna in the horizontal direction and the vertical direction respectively, and λ is the signal wavelength. Antenna elements in the array antenna are generally spaced λ/2 apart, and side lengths of M×N are respectively $D_y \approx N\lambda/2$ and $D_z \approx M\lambda/2$. The dimensions of the 8×16 array antenna can be expressed as: $D_y \approx 8\lambda$ and $D_z \approx 4\lambda$. The Rayleigh resolution in the normalized wave vector space can be calculated as $K_{yr}=\lambda/D_y=1/8$, $K_{zr}=\lambda/D_z=1/4$. After being converted into the corresponding Rayleigh resolution in the angular space according to the formula (9), it is determined through calculation that 25×3=75 times of sampling is required at most for sampling half of the spherical surface. The number of sampling times is significantly reduced, and the measurement efficiency is greatly improved.

In addition, a further embodiment of the present disclosure discloses a power measurement apparatus, including a memory, a processor, and a computer program stored in the memory and executable by the processor, where the computer program, when executed by the processor, causes the processor to perform the power measurement method of any embodiment described above.

In addition, a further embodiment of the present disclosure discloses a computer-readable storage medium storing computer-executable instructions configured to cause a computer to perform the power measurement method of any embodiment described above.

Additionally, a further embodiment of the present disclosure discloses a computer program product, including a computer program or computer instructions, where the computer program or the computer instructions are stored in a computer-readable storage medium, a processor of a computer device reads the computer program or the computer instructions from the computer-readable storage medium, and the computer program or the computer instructions, when executed by the processor, cause the computer device to perform the power measurement method as described in any of the previous embodiments.

It can be understood by those of ordinary skill in the art that all or some of the steps of the methods and systems disclosed above may be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software may be distributed on computer-readable media, which may include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and may include any information transmission media.

The above is a detailed description of some embodiments of the present disclosure, but the present disclosure is not limited to the above-mentioned embodiments. Those of ordinary skill in the art can also make various equivalent modifications or replacements without departing from the scope of the present disclosure, and these equivalent modifications or replacements are all included in the scope defined by the claims of the present disclosure.

What is claimed is:

1. A power measurement method, applied to a power measurement apparatus, comprising:

acquiring a signal power and a signal wavelength of a measurement signal transmitted by a base station under test;

calculating an equivalent isotropic radiated power of the measurement signal according to the signal power and the signal wavelength; and calculating a total radiated power of a carrier signal of the base station under test according to the equivalent isotropic radiated power of the measurement signal, a preset target direction parameter and a preset power ratio factor;

wherein the preset target direction parameter is a directional parameter indicating a direction of the base station under test relative to the power measurement apparatus, and the preset power ratio factor is a ratio factor used to calculate a power ratio of the measurement signal to the carrier signal.

2. The power measurement method of claim 1, wherein the calculating an equivalent isotropic radiated power of the measurement signal according to the signal power and the signal wavelength comprises:

acquiring a measurement distance between the power measurement apparatus and the base station under test;

acquiring a gain parameter of a measurement antenna of the power measurement apparatus; and calculating the equivalent isotropic radiated power of the measurement signal according to the measurement distance, the gain parameter, the signal power, and the signal wavelength.

3. The power measurement method of claim 2, wherein the measurement distance is obtained by:

acquiring a dimension parameter of a transmitting antenna of the base station under test; and calculating the measurement distance between the power measurement apparatus and the base station under test according to the dimension parameter and the signal wavelength.

4. The power measurement method of claim 1, wherein the calculating a total radiated power of a carrier signal of the base station under test according to the equivalent isotropic radiated power of the measurement signal, a preset target direction parameter and a preset power ratio factor comprises:

calculating a total radiated power of the measurement signal according to the preset target direction parameter and the equivalent isotropic radiated power of the measurement signal; and calculating the total radiated power of the carrier signal of the base station under test according to the preset power ratio factor and the total radiated power of the measurement signal.

5. A power measurement apparatus, comprising: a memory, a processor, and a computer program stored in the memory and executable by the processor, wherein the computer program, when executed by the processor, causes the processor to perform the power measurement method of claim 1.

6. A non-transitory computer-readable storage medium, storing computer-executable instructions configured to cause a computer to perform the power measurement method of claim 1.

7. A computer program product, comprising a computer program or computer instructions, wherein the computer program or the computer instructions are stored in a computer-readable storage medium, a processor of a computer device reads the computer program or the computer instructions from the computer-readable storage medium, and the computer program or the computer instructions, when executed by the processor, cause the computer device to perform the power measurement method of claim 1.

* * * * *